(12) United States Patent
Katyal et al.

(10) Patent No.: US 8,050,543 B2
(45) Date of Patent: Nov. 1, 2011

(54) TRIGGER MECHANISM FOR CURRENT ACQUISITION USED FOR MOTOR CONTROL APPLICATIONS

(75) Inventors: Gourav Katyal, Bangalore (IN); Bysani Surendra, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 561 days.

(21) Appl. No.: 12/210,214

(22) Filed: Sep. 14, 2008

(65) Prior Publication Data

US 2010/0066295 A1    Mar. 18, 2010

(51) Int. Cl.
*H02P 7/29* (2006.01)
(52) U.S. Cl. .............. 388/811; 318/400.02; 318/400.04; 318/400.11
(58) Field of Classification Search ............. 318/400.02, 318/400.04, 400.11, 801, 802, 729, 811, 318/720; 388/811
See application file for complete search history.

(56) References Cited

U.S. PATENT DOCUMENTS

| | | | |
|---|---|---|---|
| 5,614,803 A * | 3/1997 | Morioka et al. ............. 318/801 |
| 5,648,725 A * | 7/1997 | Divljakovic et al. .......... 324/551 |
| 5,811,957 A * | 9/1998 | Bose et al. .................... 318/802 |
| 5,874,818 A * | 2/1999 | Schuurman .............. 318/400.04 |
| 6,084,364 A * | 7/2000 | Menegoli ................. 318/400.11 |
| 6,281,658 B1 * | 8/2001 | Han et al. ....................... 318/729 |
| 6,313,593 B1 * | 11/2001 | Matsubara et al. ............ 318/434 |
| 6,407,167 B1 * | 6/2002 | Shishido et al. ................ 525/67 |
| 6,445,155 B1 | 9/2002 | Williams et al. |
| 6,961,015 B2 * | 11/2005 | Kernahan et al. ............. 341/165 |
| 7,119,530 B2 * | 10/2006 | Mir et al. .................... 324/76.15 |
| 7,183,737 B2 | 2/2007 | Kitagawa |
| 7,193,388 B1 | 3/2007 | Skinner |
| 2002/0014876 A1 * | 2/2002 | Han et al. ...................... 318/729 |
| 2004/0169488 A1 | 9/2004 | Maeda |
| 2006/0176059 A1 * | 8/2006 | Mir et al. ....................... 324/503 |
| 2008/0061727 A1 | 3/2008 | Tomigashi |
| 2008/0272732 A1 * | 11/2008 | Schulz et al. ................. 318/811 |
| 2009/0284194 A1 * | 11/2009 | Forte ........................ 318/400.02 |

FOREIGN PATENT DOCUMENTS

EP    1819037    8/2007

OTHER PUBLICATIONS

Atmel Corporation, "AVR443: Sensor-based Control of Three Phase Brushless DC Motor," Feb. 2006.

* cited by examiner

*Primary Examiner* — Paul Ip
(74) *Attorney, Agent, or Firm* — Robert Desmond, Esq.

(57) ABSTRACT

A trigger mechanism for starting current acquisition for motor control applications is disclosed. The present invention may generate an edge (ADC trigger) that can be used to start current acquisition by the ADC. The present invention may reduce the overhead involved in synchronizing the current acquisition with PWM generation and also minimize the wait period for software conversions to complete by replacing software-based timing with a hardware-based trigger mechanism.

16 Claims, 4 Drawing Sheets

TRIGGER MECHANISM FOR CURRENT ACQUISITION USED FOR MOTOR CONTROL APPLICATIONS

BACKGROUND OF THE INVENTION

The present invention relates to apparatus and methods for triggering current acquisition and, more particularly, to apparatus and methods for triggering current acquisition used for motor control applications as soon as a valid state is detected on the motor drive.

Field oriented control of motor drive depends upon accurate and timely acquisition of phase currents. Additionally, the currents need to be acquired at specific conditions of the motor drive. These conditions are given in terms of pulse width modulation (PWM) signals. The phase current acquisition has to be initiated when all three PWM signals are either at logic 0 (also known as a "000 condition") or when all three are at logic 1 (also known as a "111 condition").

However, the pulse widths are variable among the three phases and the exact time when the acquisition needs to be started (logic 0 or logic 1) is difficult to determine. The existing implementations use center aligned PWM waves and start the acquisition when the center time is reached at either logic 0 or logic 1.

This scheme has two major drawbacks. First, the time lost by not starting the current acquisition at the instance the valid condition occurred has to be compensated by waiting for the conversion to complete when reading the current back from the analog to digital converter (ADC). Second, the overhead of synchronizing with the center time of the PWM (usually done in software) also can eat away at real time usage.

The ADCs used to actually acquire the motor phase currents need to be triggered so that they can start the signal acquisition. Typically, this is done using a software counter. In cases where a software timer (or counter) can not be coupled with generating the PWM drive and triggering the acquisition, this scheme cannot be used.

As can be seen, there is a need for apparatus and methods for starting current acquisition as soon as possible and for removing the overhead in synchronizing the center times so that the ADC can be triggered as soon as a valid state (000 or 111) is detected on the PWM drive.

SUMMARY OF THE INVENTION

In one aspect of the present invention, a trigger mechanism for current acquisition comprises an inverter generating pulse width modulation (PWM) signals for each phase of a motor; a trigger mechanism receiving the PWM signals, the trigger mechanism including at least one control logic for comparing the PWM signals and generating an output signal for at least one of the control logic, wherein when the output signal is high, the output signal is used to trigger current acquisition by an analog to digital converter (ADC).

In another aspect of the present invention, a trigger mechanism for current acquisition comprises an inverter generating three pulse width modulation (PWM) signals, one PWM signal for each of the three phases of a motor; a trigger mechanism receiving the three PWM signals, the trigger mechanism including an AND block and a NOR block, the AND block generating a high output signal when each of the three PWM signals are in a logic 1 state, and the NOR block generating a high output signal when each of the three PWM signals are in a logic 0 state, wherein when the output signal is high, the output signal is used to trigger current acquisition by an analog to digital converter (ADC).

In a further aspect of the present invention, a method for triggering acquisition of phase currents for motor control comprises obtaining a PWM signal from each phase of the motor control; inputting each of the PWM signals to a control logic; and triggering current acquisition when the control logic generates a high signal for a predefined valid PWM state.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides a trigger mechanism and related methods for starting current acquisition for motor control applications as soon as possible and for removing the overhead in synchronizing the center times so that the ADC can be triggered as soon as a valid state (000 or 111) is detected on the PWM drive. The present invention may generate an edge (ADC trigger) that can be used to start current acquisition by the ADC.

Unlike conventional current acquisition schemes, which may use software to determine a center time of a valid state and thereby preventing true real time usage, the present invention may save the overhead involved in synchronizing the current acquisition with PWM generation and also minimize the wait period for the prior art software conversions to complete.

Figure 1:
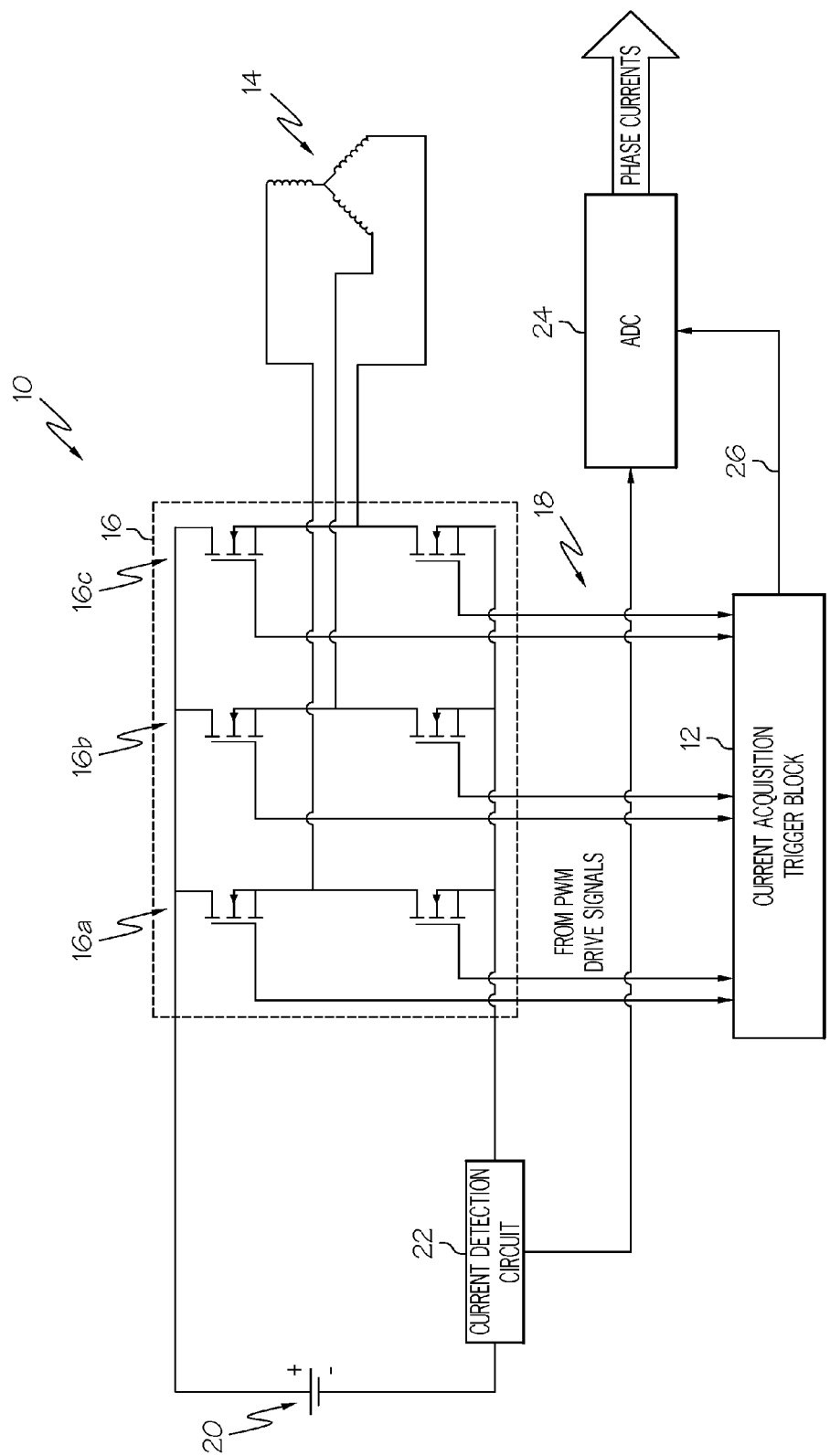
FIG. 1 is a schematic drawing showing a motor control scheme using the trigger mechanism of the present invention.

Referring to FIG. 1, there is shown a schematic drawing of a motor control scheme 10 using a trigger mechanism 12 according to the present invention. A motor 14 of the motor control scheme 10 may be, for example, a three-phase permanent magnet synchronous motor. An inverter 16 may be provided with a half bridge circuit 16a, 16b, 16c for each of the phases of power delivered to the motor 14. The inverter 16 may generate a pulse width modulation (PWM) signal 18 for each phase.

The motor control scheme may include a DC power supply 20 providing power to the inverter 16 and a current detection circuit 22 for powering on and off an analog to digital converter (ADC) 24 based on the presence or absence of DC power.

The trigger mechanism 12, as described in greater detail below in reference to FIG. 2, may receive the PWM signals 18 from the inverter 16 and generate an output 26 which may, depending on the PWM signals 18, turn on current acquisition by the ADC 24.

Figure 2:
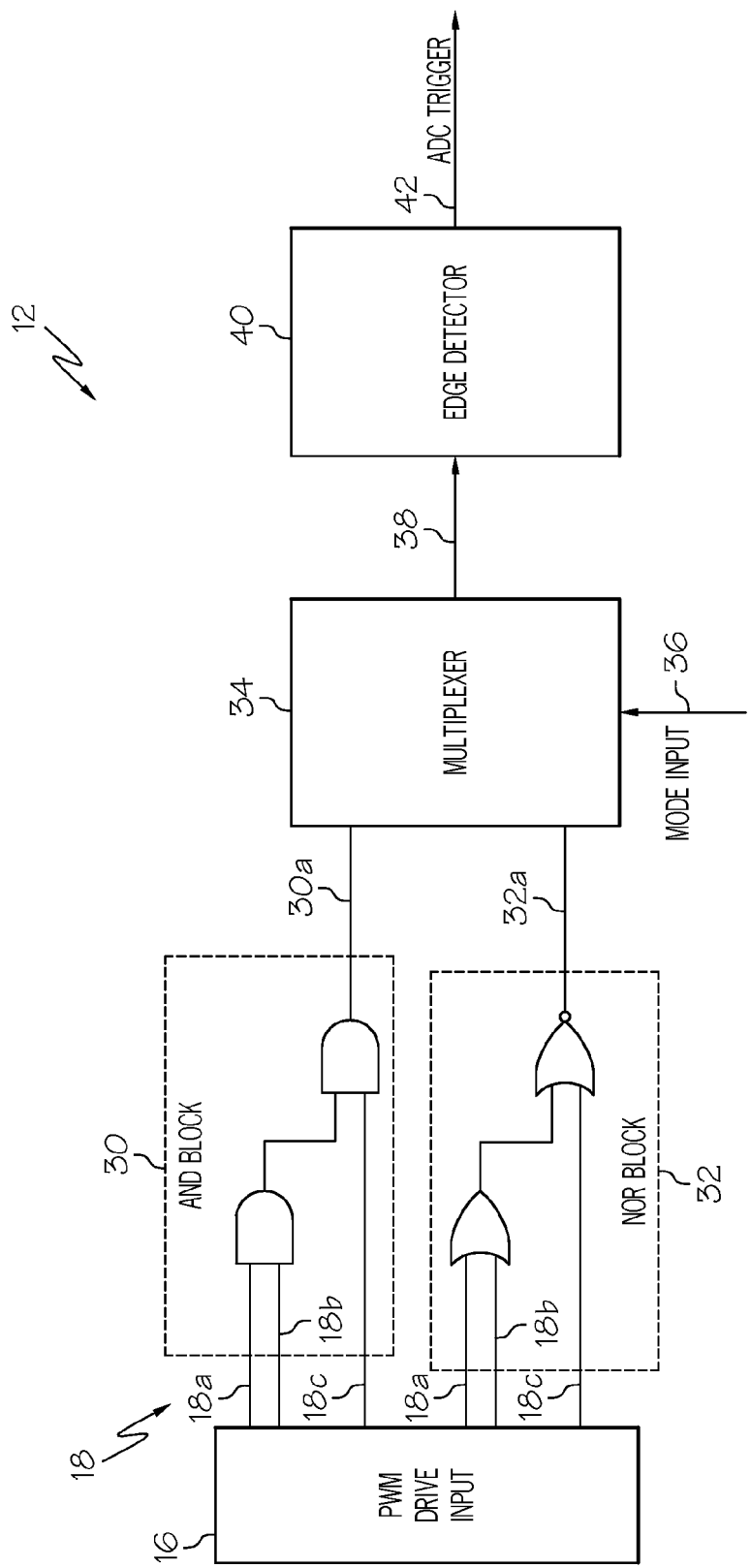
FIG. 2 is a schematic drawing showing the trigger acquisition control block of the present invention.

Referring now to FIG. 2, there is shown a schematic drawing of the trigger mechanism 12 of the present invention. The PWM drive input may be from the inverter 16, as described in FIG. 1. Each phase signal 18a, 18b, 18c of the PWM signal 18 may be provided to a control logic, such as an AND block 30 and a NOR block 32. In this case, when the phase signals 18a, 18b, 18c are (1, 1, 1), a valid state (logic 1) may be detected and the output from the AND block 30 may be high (also referred to as a "1" signal). In addition, when the phase signals 18a, 18b, 18c are (0, 0, 0), a valid state (logic 0) may be detected and the output from the NOR block 32 may be "1".

A multiplexer 34 may be provided with a mode input 36. The AND block 30 output signal 30a and the NOR block 32 output signal 32a that may be provided to the multiplexer 34 which may output one of these signals 30a, 32a to an edge detector 40. The edge detector 40 may be a circuit known in the art for changing a level input into an edge output for switching a device. In this case, the level input may be (during a valid state), a "1" signal 38. The edge detector 40 may convert this level "1" signal 38 into an edge signal 42 for activating the ADC 24 (see FIG. 1). The multiplexer 34 may be a typical multiplexer integrated circuit (IC), such as a 7400 series IC, as is known in the art.

Another way of re-creating the motor phase currents, as is conventionally performed in the prior art, is to sample the DC current drawn by the motor at specific intervals such that only one motor phase current is flowing. Thus, if the current at the DC power supply is sampled at that particular instance, it would equal the motor phase current. Typically, this method would involve a peripheral or module that is generating the PWM drive signals to initiate the current acquisition. Thus, the peripheral will add to the overhead to generate the trigger signal as well as the real time usage of the system.

Figure 3:
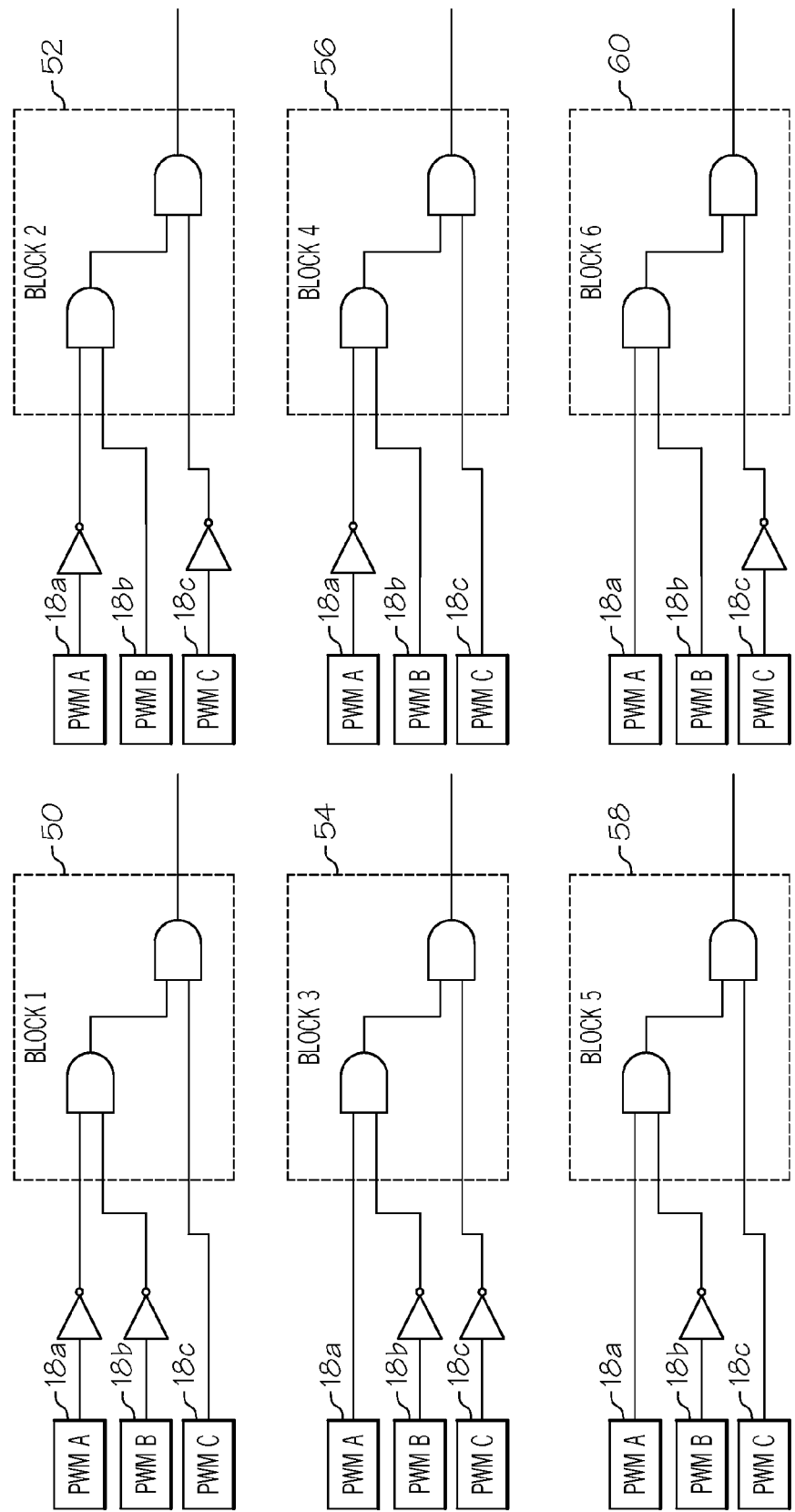
FIG. 3 is a schematic drawing showing circuits for detecting various energizing patterns according to an embodiment of the present invention.

A solution for the issues described in the above paragraph may be found in the embodiment of the present invention as shown in FIG. 3. The AND block 30 and the NOR block 32 of FIG. 2 may be replaced by or supplemented with blocks 1-6 (labeled 50, 52, 54, 56, 58 and 60, respectively), thus providing the multiplexer 34 with either 6 (if replaced by) or 8 (if supplemented with) inputs. In either event, the mode input 36 may instruct the multiplexer 34 which input is of interest and to be delivered as the output 38.

Table 1 below shows the various inputs for each of the PWM signals 18a, 18b, 18c and which phase current may be detected by such an input. For example, if it was determined that the current in PWM C (18c) was to be the trigger (logic 0, 0, 1, wherein PWM C is the high ("H") signal), the circuit of block 50 may be used to generate a "1" output in such a case. If it was determined that the current in PWM B (18b) was to be the trigger (logic 0, 1, 0), the circuit of block 52 may be used to generate a "1" output. Finally, if it was determined that the current in PWM B (18b) and in PWM C (18c) was to be the trigger (logic 0, 1, 1; also referred to as -PCM A), then the circuit of block 56 may be used to generate a "1" output. As discussed above, the selection of which block is used may be controlled with the mode input 36 of the multiplexer 34.

TABLE 1

Phase currents detected for various PWM inputs

| PWM A | PWM B | PWM C | Phase current detected | Block |
|---|---|---|---|---|
| L | L | H | PWM C | Block 50 |
| L | H | L | PWM B | Block 52 |
| H | L | L | PWM A | Block 54 |
| L | H | H | -PWM A | Block 56 |
| H | L | H | -PWM B | Block 58 |
| H | H | L | -PWM C | Block 60 |

Figure 4:
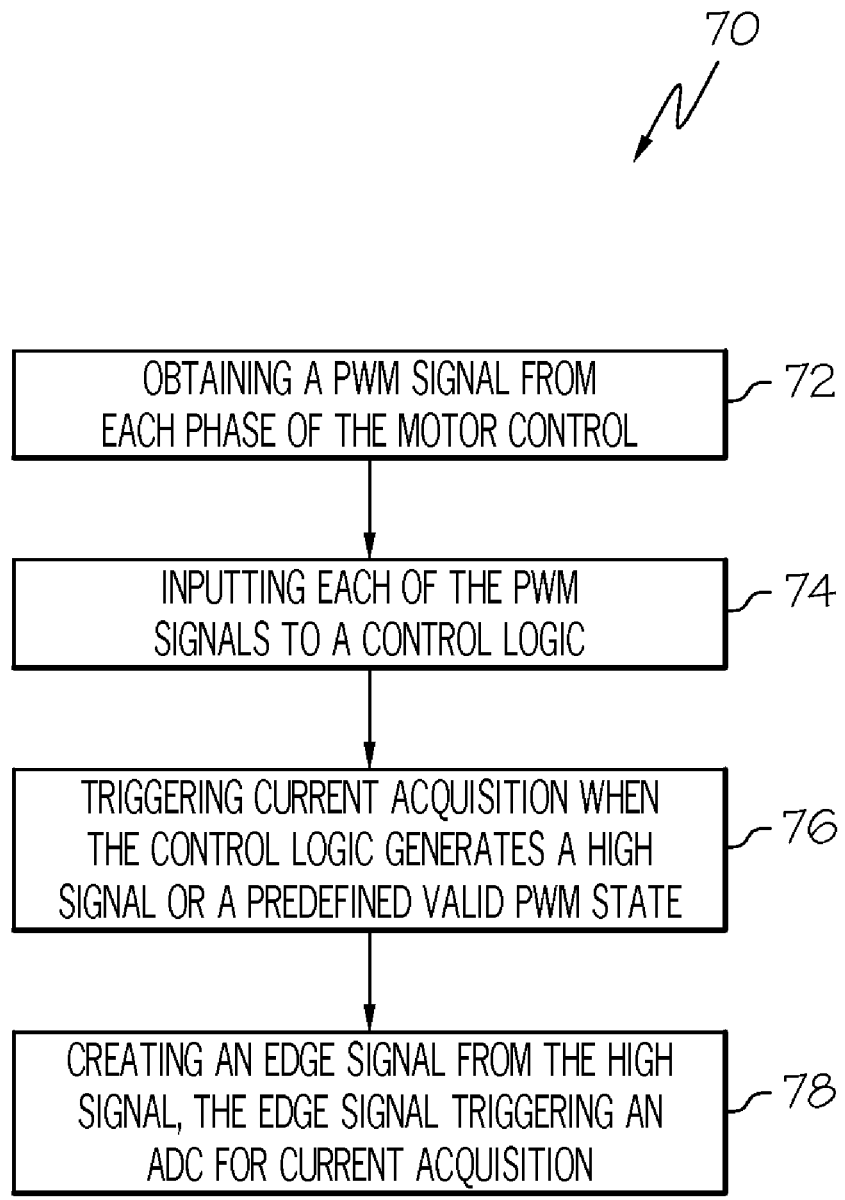
FIG. 4 describes a method for triggering acquisition of phase currents for motor control according to an embodiment of the present invention.

Referring now to FIG. 4, there is shown a method 70 for triggering acquisition of phase currents for motor control, according to an embodiment of the present invention. The method 70 may include a step 72 of obtaining a PWM signal (e.g., PWM signals 18a, 18b, 18c) from each phase of the motor control. The method 70 may further include a step 74 of inputting each of the PWM signals to a control logic (e.g., AND block 30, NOR block 32, blocks 50, 52, 54, 56, 58, 60 or combinations thereof). For example, when the control logic is an AND block, the control logic may AND together each of the PWM signals. Therefore, the output of the control logic (AND gate) is high only when each of the PWM signals is high. Similarly, when the control logic is a NOR block, the output of the control logic (NOR gate) is high only when each of the PWM signals is low. The method 70 may further include a step 76 of triggering current acquisition when the control logic generates a high signal for a predefined valid PWM state. This predefined valid PWM state may be determined by the use of a mode selector (e.g., mode selector 36) and a multiplexer (e.g., multiplexer 34). The method 70 may further include a step 78 of creating an edge signal from the high signal, wherein the edge signal is used to trigger an ADC for current acquisition.

It should be understood, of course, that the foregoing relates to exemplary embodiments of the invention and that modifications may be made without departing from the spirit and scope of the invention as set forth in the following claims.

We claim:

1. A trigger mechanism for current acquisition comprising:
   an inverter generating pulse width modulation (PWM) signals for each phase of a motor;
   a control logic comprising at least six AND blocks comparing the PWM signals and generating an output signal from the control logic, wherein
   when the output signal is high, the output signal is used to trigger current acquisition by an analog to digital converter (ADC), and
   each of the six AND blocks is configured to receive a PWM signal for at least one phase of the motor through a logic inverter.

2. The trigger mechanism of claim 1, further comprising a seventh AND block and a NOR block, the seventh AND block generating a high output signal when each of the PWM signals are in a logic 1 state, and the NOR block generating a high output signal when each of the PWM signals are in a logic 0 state.

3. The trigger mechanism of claim 1, wherein the PWM signals include three PWM signals, one from each corresponding phase of the motor.

4. The trigger mechanism of claim 1, further comprising:
   a multiplexer receiving output signals from the control logic; and
   a mode input for selecting one output signal as an output from the multiplexer.

5. The trigger mechanism of claim 1, further comprising an edge detector receiving the output signal and generating an edge signal therefrom, the edge signal triggering the ADC.

6. The trigger mechanism of claim 4, further comprising an edge detector receiving the output from the multiplexer and generating an edge signal therefrom, the edge signal triggering the ADC.

7. The trigger mechanism of claim 1, wherein the control logic outputs a high signal when at least one of the PWM signals are in a logic 1 state and when at least one of the PWM signals are in a logic 0 state.

8. The trigger mechanism of claim 7, further comprising:
a multiplexer receiving output signals; and
a mode input for selecting one output signal as an output from the multiplexer.

9. The trigger mechanism of claim 7, further comprising an edge detector receiving the output signal and generating an edge signal therefrom, the edge signal triggering the ADC.

10. The trigger mechanism of claim 8, further comprising an edge detector receiving the output from the multiplexer and generating an edge signal therefrom, the edge signal triggering the ADC.

11. A trigger mechanism for current acquisition comprising:
an inverter generating three pulse width modulation (PWM) signals, one PWM signal for each of the three phases of a motor;
an AND block and a NOR block, each receiving the three PWM signals and each generating an output signal, wherein
the AND block generating a high output signal when each of the three PWM signals are in a logic 1 state, and the NOR block generating a high output signal when each of the three PWM signals are in a logic 0 state;
at least one logic block for outputting an additional output signal, the additional output signal being a high output signal when at least one of the three PWM signals are in a logic 1 state and when at least one of the three PWM signals are in a logic 0 state,
the at least one logic block including six logic blocks, one for each possible combination of the three PWM signals wherein at least one of the three PWM signals are in a logic 1 state and when at least one of the three PWM signals are in a logic 0 state,
wherein when either of the output signals is high, the high output signal is used to trigger current acquisition by an analog to digital converter (ADC).

12. The trigger mechanism of claim 11 further comprising:
a multiplexer receiving output signals from the AND block and from the NOR block;
a mode input for selecting one output signal as an output from the multiplexer; and
an edge detector receiving the selected output signal from the multiplexer and generating an edge signal therefrom, the edge signal triggering the ADC when the selected output signal from the multiplexer is high.

13. A method for triggering acquisition of phase currents for motor control, the method comprising:
obtaining a pulse width modulation (PWM) signal from each phase of the motor control;
inputting each of the PWM signals to a control logic that includes:
at least one logic block for outputting a high output signal when at least one of three PWM signals are in a logic 1 state and when at least one of the three PWM signals are in a logic 0 state; and
six logic blocks, one for each possible combination of the three PWM signals wherein at least one of the three PWM signals are in a logic 1 state and when at least one of the three PWM signals are in a logic 0 state; and
triggering current acquisition when the control logic generates the high signal for a predefined valid PWM state.

14. The method of claim 13, further comprising defining a valid PWM state as one of a logic 1 state or a logic 0 state.

15. The method of claim 13, further comprising creating an edge signal from the high signal, wherein the edge signal is used to trigger an analog to digital converter (ADC) for current acquisition.

16. The method of claim 13, further comprising using three phases for the motor control.

* * * * *